United States Patent [19]

Chambers, Jr.

[11] 3,763,319

[45] Oct. 2, 1973

[54] IMPEDANCE RESPONSIVE VOLTAGE BOOSTER CIRCUIT FOR TELEPHONE SYSTEMS

[75] Inventor: Charles W. Chambers, Jr., Amherst, Ohio

[73] Assignee: Lorain Products Corporation, Lorain, Ohio

[22] Filed: Feb. 22, 1971

[21] Appl. No.: 117,627

[52] U.S. Cl. .......... 179/16 F

[51] Int. Cl. .......... H04g 1/28

[58] Field of Search .......... 179/16 E, 16 F, 16 A, 179/16 AA, 16 EA

[56] References Cited

UNITED STATES PATENTS

| | | | |
|---|---|---|---|
| 3,660,609 | 5/1972 | Tremblay et al. | 179/16 F |
| 3,639,696 | 2/1972 | Chambers, Jr. | 179/16 F |
| 3,626,201 | 12/1971 | Chambers, Jr. | 179/16 F |
| 3,531,598 | 9/1970 | McNair, Jr. | 179/16 F |
| 3,527,894 | 9/1970 | Mesenhimer et al. | 179/16 F |
| 3,514,543 | 5/1970 | Rae | 179/16 F |

*Primary Examiner*—Kathleen H. Claffy
*Assistant Examiner*—Randall P. Myers
*Attorney*—John Howard Smith

[57] ABSTRACT

The invention includes a circuit for additively increasing the d-c operating voltage of long subscriber lines in telephone systems utilizing reverse battery supervision. A plurality of switching circuits are disposed in series with respective conductors of a subscriber line to maintain voltage booster sources in series, power-aiding relationship between a central office battery and a long subscriber line. The circuit of the invention also prevents the voltage booster sources from increasing the voltage which the central office battery applies to the long subscriber line when the long subscriber line is open-circuited at the subscriber station as, for example, during dial pulse interruptions. This assures that the voltage boosting circuitry can increase the level of current flowing through the long subscriber line without impairing the dialing characteristics of that line.

28 Claims, 5 Drawing Figures

INVENTOR.
CHARLES W. CHAMBERS JR.

BY *[signature]*

ATTORNEY

INVENTOR.
CHARLES W. CHAMBERS JR.
BY John Howard Smith
ATTORNEY

INVENTOR.
CHARLES W. CHAMBERS JR.
BY John Howard Smith
ATTORNEY

INVENTOR.
CHARLES W. CHAMBERS JR.
BY [signature]
ATTORNEY

IMPEDANCE RESPONSIVE VOLTAGE BOOSTER CIRCUIT FOR TELEPHONE SYSTEMS

BACKGROUND OF THE INVENTION

The present invention relates to voltage booster circuits and is directed more particularly to voltage booster circuits for telephone systems.

An important consideration in the provision of telephone service is the maintenance of an adequate d-c current flow in each subscriber line. This subscriber line current performs a variety of telephone system operations including the operation of a dialing relay during dialing and the operation of a trip relay to terminate the ringing sound when the called party's receiver is lifted. If the subscriber line current is of insufficient magnitude, the above named relays and others will fail to operate and the telephone set or sets connected to that subscriber line will be useless.

The difficulty in establishing an adequate d-c current flow in each of a multiplicity of subscriber lines is that each subscriber line has a d-c resistance which is a function of the length of that line. For economic reasons it has been found advantageous to energize the majority of subscriber lines from a central office battery of generally adequate terminal voltage, and to provide a plurality of voltage booster circuits to increase the voltage applied to those relatively few subscriber lines having resistances too high to operate directly from the central office battery. These voltage booster circuits are arranged to add a d-c boost voltage in series-aiding relationship between the central office battery and respective high resistance subscriber lines.

Because of the widespread use of reverse battery supervision, that is, the use of reversals in the polarity with which the central office battery is applied to a subscriber line for supervisory or control purposes, a voltage booster source which is connected in series-aiding relationship to the subscriber line current for one central office battery polarity is in series opposition to the subscriber line current for the opposite central office battery polarity. In order to overcome this problem, various voltage booster circuits have been developed which will coordinate the polarity of the serially added boost voltage with the then polarity of central office battery so as to assure a series-aiding relationship therebetween in the presence of supervisory polarity reversals. While these voltage booster circuits operate with some success with subscriber lines having a high leakage resistance (i.e., lines which present a high resistance to the central office when the telephone sets connected thereto are open-circuited) prior to the present invention no voltage booster circuit had been developed which would operate satisfactorily with subscriber lines having excessively low leakage resistances.

In subscriber lines which have a low leakage resistance, a boost voltage increases the leakage current in the line to the point where the central office dialing relay cannot assume its de-energized state during dial pulse interruptions. If, for example, the dialing relay is arranged to pull-up when the subscriber liner current rises above 15 milliamperes and to drop-out when the subscriber line current drops below 7 milliamperes, the presence of a 48 volt booster source between a 48 volt central office battery and a subscriber line having a 10,000 ohm leakage resistance will result in the flow of a 9.6 milliampere current during each dial pulse interruption. Since this leakage current exceeds the 7 milliampere drop-out current of the dialing relay, the latter will remain energized during the entire dial pulse interruption resulting in the failure of dialing.

With the present invention, there is provided means for controlling the amount of serially added boost voltage, in accordance with the instantaneous resistance of the subscriber line, to eliminate the above described dialing problem.

SUMMARY OF THE INVENTION

It is an object of the invention to provide an improved voltage booster circuit for telephone systems.

Still another object of the invention is to provide a voltage booster circuit which additively increases the d-c operating voltage of a subscriber line for both directions of current flow in the subscriber line.

It is another object of the invention to provide a voltage booster circuit suitable for use with subscriber lines which have low leakage resistances.

Another object of the invention is to provide a voltage booster circuit which increases the d-c operating voltage of a subscriber line except when the latter is open circuited as, for example, during dial pulse interruptions.

It is a further object of the invention to provide a voltage booster circuit which boosts the operating voltage of a subscriber line when the subscriber line current exceeds a predetermined value but which removes the boost voltage when the subscriber line current drops below a preset value greater than zero.

Yet another object of the invention is to provide a voltage booster circuit including one or more voltage booster sources and a plurality of switching networks for inserting and removing these booster sources in accordance with the central office terminal polarity and the magnitude of the subscriber line current.

A still further object of the invention is to provide a voltage booster circuit wherein the switching networks which control the insertion and removal of the boost voltage sources exhibit a latching characteristic and wherein the current available for maintaining such switching networks in their latched or conducting states is a preselected function of the subscriber line current.

It is another object of the invention to provide a voltage booster circuit including a capacitor for filtering the inserted boost voltage and for lowering the a-c impedance which the booster circuit presents to the a-c or talking component of the subscriber line current.

Still another object of the invention is to provide circuitry for discharging the above capacitor within a time sufficiently short to prevent it from boosting the subscriber line current during dial pulse interruptions.

DESCRIPTION OF THE INVENTION

Figure 1:
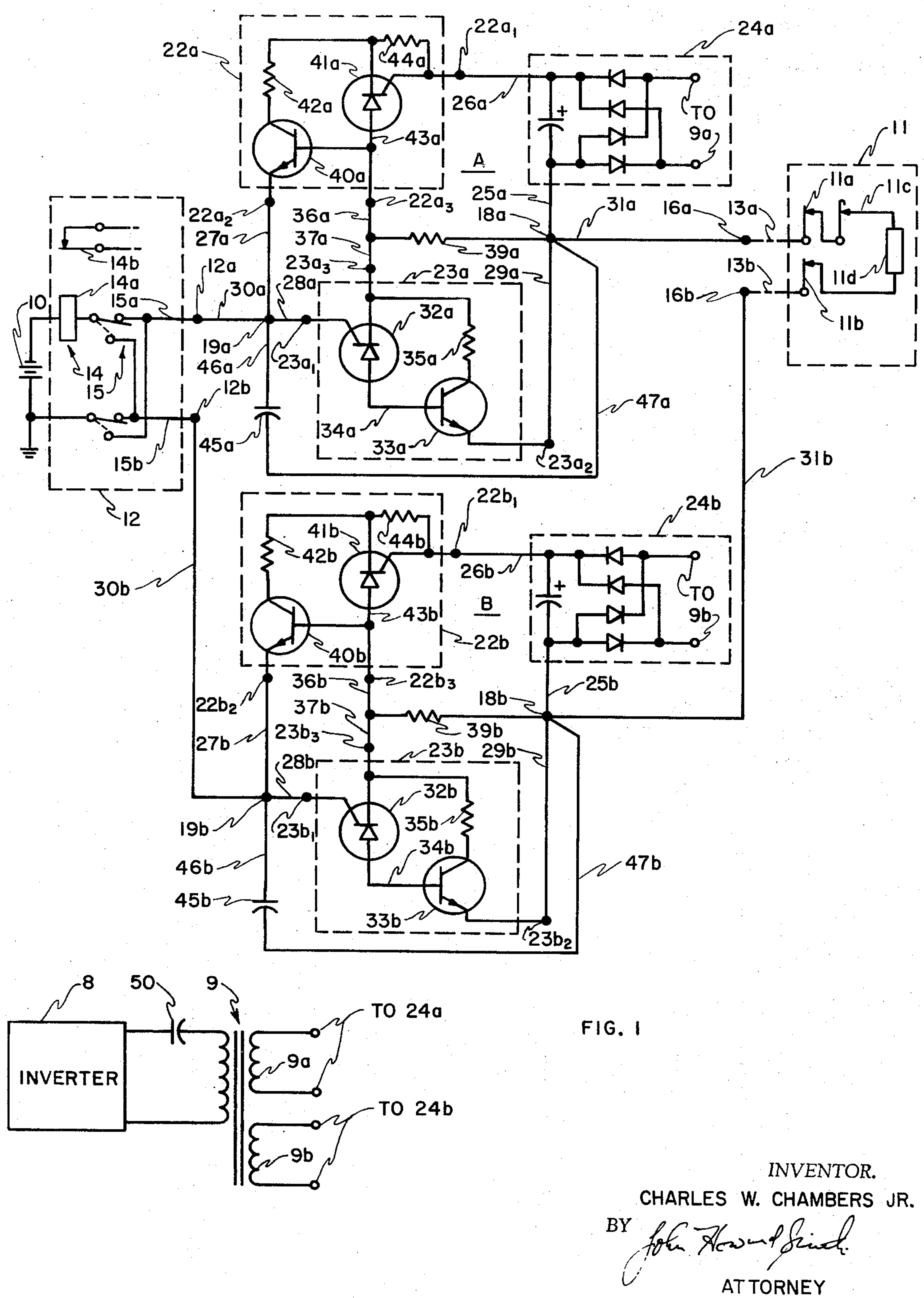
FIG. 1 is a schematic diagram of an exemplary voltage booster circuit embodying the invention.

Referring to FIG. 1, there is shown a central office battery 10 for energizing a subscriber telephone set 11 through suitable central office switching equipment 12, the booster circuitry of the invention and subscriber line conductors 13_a_ and 13_b_. Central office switching equipment 12 includes a dialing relay 14 having a coil 14_a_ and contacts 14_b_ and a switch 15 for reversing the polarity of the connections between battery 10 and central office equipment terminals 12_a_ and 12_b_ to accomplish reverse battery supervision. It will be understood that the central office includes switchgear other than that shown in FIG. 1, but that such other switchgear has been omitted because its inclusion is not necessary to attain an understanding of the circuit of the invention.

Subscriber telephone set 11 includes hook switch contacts 11_a_ and 11_b_ which close when the subscriber's handset is lifted from the receiver and a dialing contact 11_c_ which opens and closes, in accordance with the number dialed by the subscriber, to energize and deenergize dialing relay 14. The remainder of the subscriber set is indicated by a symbol 11_d_ representing its impedance. It will be understood that subscriber telephone set 11 may comprise the telephone set of a single subscriber or may comprise any one of the telephone sets of a plurality of subscribers which are connected as party lines to subscriber line conductors 13_a_ and 13_b_. The central office terminations of conductors 13_a_ and 13_b_ are shown at 16_a_ and 16_b_, respectively.

To the end that central office battery 10 may supply adequate d-c operating current to telephone set 11, in spite of the resistance of conductors 13_a_ and 13_b_, there is provided the booster circuitry of the invention. In the present embodiment, this circuitry includes a booster circuit A having a first terminal 18_a_ and a second terminal 19_a_ for disposition between central office terminal 12_a_ and subscriber line terminal 16_a_ and a booster circuit B having a first terminal 18_b_ and a second terminal 19_b_ for disposition between central office terminal 12_b_ and subscriber line terminal 16_b_.

Each booster circuit includes a first switching network for controlling the flow of subscriber line current when subscriber line current attempts to flow in one direction and a second switching network for controlling the flow of subscriber line current when subscriber line current attempts to flow in the other direction. Booster circuit A, for example, includes a first switching network 22_a_ for controlling the flow of subscriber line current toward central office 12 in conductor 13a and a second switching network 23_a_ for controlling the flow of subscriber line current away from central office 12 in conductor 13_a_. Similarly, booster circuit B includes a first switching network 22_b_ for controlling the flow of subscriber line current toward the central office in conductor 13_b_ and a second switching network 23_b_ for controlling the flow of subscriber line current away from the central office in conductor 13_b_.

Conduction through the above switching networks is controlled in accordance with the polarity of the voltage which central office battery 10 establishes between central office terminals 12_a_ and 12_b_ to assure that a d-c boost voltage appears in power-aiding relationship to the then flowing subscriber line current. To the end that this may be accomplished, a booster source 24_a_, which here takes the form of an a-c to d-c converter network energized by an inverter 8 through the secondary 9_a_ of a transformer 9, is connected in series with first switching network 22_a_ through conductors 25_a_, 26_a_ and 27_a_ and a booster source 24_b_ is connected in series with first switching network 22_b_ through conductors 25_b_, 26_b_ and 27_b_.

During the time when first switching network 22_a_ of booster circuit A conducts subscriber line current from telephone set 11 to central office 12 through booster source 24_a_ and conductor 13_a_, second switching network 23_b_ of booster circuit B conducts subscriber line current from central office 12 to telephone set 11 through conductor 13b. Similarly, during the time when first switching network 22_b_ of booster circuit B conductors subscriber line current from telephone set 11 to central office 12 through booster source 24_b_ and conductor 13_b_, second switching network 23_a_ of booster circuit A conducts subscriber line current from central office 12 to telephone set 11 through conductor 13_a_. It will therefore be seen that the first switching network of each booster circuit serves to insert the respective booster source while the second switching network of that booster circuit serves to complete a path for the flow of current through the first switching network of the other booster circuit by bypassing current around the respective first switching network when the latter is non-conducting. Thus, booster circuits A and B comprise boost-bypass circuits in that they either boost or bypass the subscriber line current flowing therethrough depending upon the direction of current flow (clockwise or counter-clockwise in FIG. 1) in the subscriber line.

When polarity reversing switch 15 is in the position shown in solid lines in FIG. 1, that is, when central office battery 10 renders central office terminal 12_b_ positive from central office terminal 12a, control circuitry to be described more fully later establishes conduction in switching networks 23_b_ and 22_a_. Under these conditions, subscriber line current flows from central office battery 10 through conductors 15_b_, 30_b_ and 28_b_, second or bypass switching network 23_b_ which provides a low impedance path between terminals $23b_1$ and $23b_2$ thereof, conductors 29_b_, 31_b_ and 13_b_ to telephone set 11. This current returns to central office battery 10 through conductors 13_a_, 31_a_, 25_a_, booster source 24_a_, conductor 26_a_, first or boost switching network 22_a_ which provides a low impedance path between terminals $22a_1$ and $22a_2$ thereof, and conductors 27_a_, 30_a_ and 15_a_. Since booster source 24_a_ appears in the above path with its positive terminal connected to the negative terminal of central office battery 10, the voltage appearing between subscriber line terminals 16_a_ and 16_b_ is substantially equal to the sum of the voltages across central office battery 10 and booster source 24_a_.

When, however, reversing switch 15 is in the position shown in dotted lines in FIG. 1, that is, when central office battery 10 renders central office terminal 12_a_ positive from central office terminal 12_b_, control circuitry to be described more fully later establishes conduction in switching networks 23_a_ and 22_b_. Under these conditions, subscriber line current flows from central office battery 10 through conductors 15_a_, 30_a_ and 28_a_, second or bypass switching network 23_a_ which provides a low impedance path between terminals $23a_1$ and $23a_2$ thereof and conductors 29_a_, 31_a_ and 13_a_ to telephone set 11. This current returns to central office battery 10 through conductors 13_b_, 31_b_, 25_b_, booster source 24_b_, conductor 26_b_, first or boost switching network 22_b_ which provides a low impedance path between terminals $22b_1$ and $22b_2$ thereof and conductors 27*b*, 30*b* and 15*a*. Since booster source 24*b* appears in the above path with its positive terminal connected to the negative terminal of central office battery 10, the voltage appearing between subscriber line terminals 16*a* and 16*b* is substantially equal to the sum of the voltages across central office battery 10 and booster source 24*b*. Thus, controlling the conductive states of the switching networks in accordance with the polarity of the central office terminal voltage assures that a booster source is maintained in series-aiding relationship to central office battery 10.

To the end that bypass switching network 23b may provide a low impedance path for the flow of subscriber line current between terminals $23b_1$ and $23b_2$, network 23*b* includes triggering means which here takes the form of a thyristor 32*b* and latching means which here takes the form of an NPN transistor 33*b*. Switching network 23*b* also includes a conductor 34*b* and a resistor 35*b*. In contrast with conventional thyristor usage, wherein a pulse of gate-to-cathode current is utilized to initiate an avalanche of anode-to-cathode current, thyristor 32*b* is utilized with its gate lead positive from both its anode lead and its cathode lead to cause current entering the gate lead to divide into a current flowing out of the cathode lead and a current flowing out of the anode lead. In such usage, the gate-to-anode current through thyristor 32*b* is substantially proportional to the gate-to-cathode current therethrough and to the current entering the gate lead thereof. Thus, thyristor 32*b* is used as a variable conducting device having a control circuit disposed between its gate-cathode leads and a power circuit disposed between its gate-anode leads.

Similarly, to the end that boost switching network 22*a* may provide a low impedance path for the flow of subscriber line current between terminals $22a_1$ and $22a_2$ thereof, network 22*a* includes triggering means which here takes the form of an NPN transistor 40*a* and latching means which here takes the form of thyristor 41*a*. Switching network 22*a* also includes a resistor 42*a* and a conductor 43*a*. As described previously with respect to thyristor 32*b*, thyristor 41a functions as a variable conducting device having a control circuit disposed between its gate-cathode leads and a power circuit disposed between its gate-anode leads.

The manner in which switching networks 23*b* and 22*a* are rendered conducting will now be described. Assuming that reversing switch 15 is in the solid line position shown in FIG. 1, central office battery 10 will render terminal 12*b* positive from terminal 12*a*. Under these conditions, a conduction initiating or trigger current will flow from central office battery 10, through conductors 15*b*, 30*b*, 28*b*, the gate-cathode control circuit of thyristor 32*b*, conductor 37*b*, trigger current conducting resistor 39*b*, conductors 31*b* and 13*b* and telephone set 11. This current will return to central office battery 10 through conductors 13*a* and 31*a*, trigger current conducting resistor 39*a*, the base-emitter control circuit of transistor 40*a* and conductors 27*a*, 30*a* and 15*a*. Because this current flows through the control circuits of thyristor 32*b* and transistor 40*a*, the power circuits of these devices will conduct and thereby provide a path for the flow of subscriber line current from central office battery 10, through conductors 15*b*, 30*b* and 28*b*, the gate-anode power circuit of thyristor 32*b*, conductor 34*b*, the base-emitter control circuit of transistor 33*b*, conductors 29*b*, 31*b*, and 13*b* and telephone set 11. The latter current will return to central office battery 10 through conductors 13*a*, 31*a* and 25*a*, booster source 24*a*, conductor 26*a*, the parallel circuit including resistor 44*a* and the gate-cathode control circuit of thyristor 41*a*, resistor 42*a*, the collector-emitter power circuit of transistor 40*a* and conductors 27*a*, 30*a* and 15*a*.

As the power circuits of transistor 33*b* and thyristor 41*a* conduct the above described subscriber line current, a latching current will begin to flow from central office battery 10, through conductors 15*b*, 30*b* and 28*b*, the gate-cathode control circuit of thyristor 32*b*, resistor 35*b*, the collector-emitter power circuit of transistor 33*b*, conductors 29*b*, 31*b* and 13*b* and telephone set 11. This latching current will return to central office battery 10 through conductors 13*a*, 31*a* and 25*a*, booster source 24*a*, conductor 26*a*, the gate-anode power circuit of thyristor 41*a*, conductor 43*a*, the base-emitter power circuit of transistor 40*a* and conductors 27*a*, 30*a* and 15*a*.

After the above described latching current has begun to flow through the collector-emitter power circuit of transistor 33*b*, the conduction of thyristor 32*b* and transistor 33*b* become independent of the flow of trigger current through resistor 39*b*. This is because the power circuit of transistor 33*b* permits the flow of conduction-maintaining control current through the control circuit of thyristor 32*b*, and because the power circuit of thyristor 32*b* permits the flow of conduction-maintaining control current through the control circuit of transistor 33*b*. Thus, transistor 33*b* and thyristor 32*b*, together with the connections therebetween, comprise a latchable switching network in that they hold each other on without the continued flow of trigger current through resistor 39*b* once they are triggered into conduction.

Similarly, the conduction of transistor 40*a* and thyristor 41*a* become independent of the flow of trigger current through resistor 39*a* after the above described latching current has begun to flow through the gate-anode power circuit of thyristor 41*a*. This is because the power circuit of transistor 40*a* permits the flow of conduction-maintaining control current through the control circuit of thyristor 41*a*, and because the power circuit of thyristor 41*a* permits the flow of conduction-maintaining control current through the control circuit of transistor 40*a*. Thus, transistor 40*a* and thyristor 41*a*, together with the conections therebetween, comprise a latchable switching network in that they hold each other on without the continued flow of trigger current through resistor 39*a*.

When thyristor 32*b* and transistor 33*b* are latched into conduction, the switching network 23*b* in which they are included provides a low impedance path between switching network terminals $23b_1$ and $23b_2$. This path has a first branch including the gate-cathode circuit of thyristor 32*b*, resistor 35*b* and the collector-emitter circuit of transistor 33*b* and a second branch including the gate-anode circuit of thyristor 32*b*, conductor 34*b* and the base-emitter circuit of transistor 33*b* which, taken together, comprise the power circuit of switching network 23*b*. The conduction of subscriber line current through this power circuit is initiated, as previously described, by the flow of current through the gate-cathode circuit of thyristor 32*b* which comprises the control circuit of switching network 23*b*.

Similarly, when transistor 40*a* and thyristor 41*a* are latched into conduction, the switching network 22*a* in which they are included provides a low impedance path between switching network terminals $23a_1$ and $23a_2$. This path has a first branch including the gate-cathode circuit of thyristor 41*a*, resistor 42*a* and the collector-emitter circuit of transistor 40*a* and a second branch including the gate-anode circuit of thyristor 41*a*, conductor 43*a* and the base-emitter circuit of transistor 40*a* which, taken together, comprise the power circuit of switching network 22*a*. The control circuit of network 22*a* is disposed between switching network terminals $22a_3$ and $22a_2$ through the base-emitter circuit of transistor 40*a*.

It will be understood that when switch 15 is in the dotted line position shown in FIG. 1, that is, when central office battery 10 renders central office terminal 12*a* positive from central office terminal 12*b*, switching networks 23*a* and 22*b* are rendered conducting in the manner described with reference to switching networks 23*b* and 22*a*, respectively.

From the foregoing, it will be seen that the conduction of switching networks 22*a*, 22*b*, 23*a* and 23*b* are controlled in accordance with the polarity of the voltage which central office battery 10 establishes between central office equipment terminals 12*a* and 12*b* (as manifested by the flow of trigger current from right to left or from left to right in resistors 39*a* and 39*b*), to insert a booster source in series-aiding relationship to central office battery 10.

To the end that boost-bypass circuits A and B may present a low impedance to the a-c or talking component of the subscriber line current, capacitors 45*a* and 45*b* are connected between terminals 18*a* and 19*a*, and 18*b* and 19*b*, respectively. In addition to bypassing a-c current, capacitors 45*a* and 45*b* serve to filter the boost voltage which boost-bypass circuits A and B cause to appear between the respective terminals thereof. When, for example, switching network 22*a* conducts to connect booster source 24*a* between terminals 18*a* and 19*a*, capacitor 45*a* will be charged to a voltage approximately equal to the voltage across booster source 24*a* by a current through the path including booster source 24*a*, conductor 26*a*, the power circuit of switching network 22*a*, conductors 27*a* and 46*a*, capacitor 45*a*, and conductors 47*a* and 25*a*. As a result, the ripple voltage from booster source 24*a* is prevented from appearing between terminals 18*a* and 19*a* and, thereby prevented from affecting the subscriber line current.

Assuming that telephone set 11 is being used to make an outgoing call, central office battery 10 will be connected to central office terminals 12*a* and 12*b* with the polarity shown in FIG. 1. This is in accordance with the established telephone system practice of maintaining a single, predetermined central office terminal polarity during dialing. Under the assumed conditions, switching networks 23*b* and 22*a* will be rendered conducting, as previously described, to apply to subscriber line terminals 16*a* and 16*b* a voltage substantially equal to the sum of the voltages across central office battery 10 and booster source 24*a*.

In accomplishing dialing, the calling party turns the finger wheel of the telephone set to the desired digit. Upon release, dialing contacts 11*c* open and close to introduce a series of interruptions into the current in subscriber line conductors 13*a* and 13*b*. These interruptions are detected in the central office by dialing relay 14 which becomes de-energized when the opening of dialing contacts 11*c* interrupts the current through coil 14*a*. The succession of energized and de-energized states of dialing relay 14 is, of course, used to control the switching equipment which connects the calling party to the called party.

Prior to the present invention, the problem has been that the leakage resistance of many subscriber lines, that is, the resistance looking into subscriber line terminals 16*a* and 16*b* when dialing contacts 11*c* are open, has been so low that the subscriber line current barely drops below the level required to de-energize dialing relay 14 during dial pulse interruptions. This problem is aggravated by the presence of a voltage booster circuit of any of the ordinary types. This is because such circuits increase the voltage appearing at subscriber line terminals 16*a* and 16*b* and thereby increase the magnitude of the subscriber line current which flows during dial pulse interruptions, that is, the leakage current of the subscriber line. If this increase in leakage current is sufficiently large, dialing relay 14 will remain energized during the entire dialing operation and thereby prevent the calling party from being connected to the called party.

To overcome the above difficulties there is provided circuitry whereby booster source 24*a* is prevented from additively increasing the voltage between subscriber line terminals 16*a* and 16*b* during dial pulse interruptions.

To the end that this may be accomplished, boost-bypass circuit A is provided with means for unlatching transistor 40*a* and thyristor 41*a* when the subscriber line current drops to its leakage current value. There is also provided means for discharging capacitor 45*a* within a time sufficient to prevent that capacitor from maintaining a boost voltage in series, power aiding-relationship to the subscriber line current after the subscriber line current drops to its leakage current value.

The unlatching of boost switching network 22a will now be described. As is well known, gate-cathode current will not flow through a thyristor unless the voltage across the gate-cathode leads thereof exceeds the gate-cathode threshold voltage. The value of this threshold may be increased by connecting a resistor such as that shown at 44*a* across the gate-cathode leads of the thyristor. This is because resistor 44*a* will hold the gate-cathode voltage below the threshold value until current therethrough develops a voltage which exceeds the gate-cathode threshold voltage. Accordingly, the threshold of thyristor 41*a* may be set, at any desired value of current, by selecting a current threshold resistor 44*a* of a suitable resistance value.

Assuming, for example, that switching network 22*a* is conducting, transistor 40 conducts a current from central office battery 10 through conductors 15*b* and 30*b*, boost-bypass circuit B, conductors 31*b* and 13*b*, telephone set 11, conductors 13*a*, 31*a* and 25*a*, booster source 24*a*, conductor 26*a*, the parallel circuit including resistor 44*a* and the gate-cathode path of thyristor 41*a*, resistor 42*a*, transistor 40a and conductors 27*a*, 30*a* and 15*a*, as previously described. If the magnitude of the current which transistor 40*a* allows to flow through resistor 44*a* drops below the threshold value required to maintain gate-cathode conduction through thyristor 41*a*, the gate-anode circuit of the latter will become non-conducting and thereby cut off the latching current which maintains conduction through transistor 40*a*. This will terminate latched conduction through switching network 22*a*. Under these conditions, booster source 24*a* will not additively increase the voltage which central office battery 10 applies to subscriber line terminals 16*a* and 16*b*. Thus, the booster circuitry of the invention prevents the boosting of the subscriber line current during dialing interruptions and thus insures reliable operation of the dialing relay 14.

In the present embodiment, boost-bypass circuit A is so arranged that the current through resistor 44*a* is sufficient to maintain conduction in thyristor 41*a* only when the current in the subscriber line is greater than a value equal to the leakage current of the line. This assures that switching network 22*a* will unlatch each time that the opening of dialing contacts 11c causes the subscriber line current to drop to its leakage current value. In this manner, booster source 24*a* is prevented from increasing the leakage current which opposes the dropout of dialing relay 14.

The manner in which latched conduction through switching network 22*a* is terminated will now be described. As described previously, latched conduction through switching network 22*a* occurs when the latching current which flows from the anode of thyristor 41*a* to the base of transistor 40*a* is sufficient to cause transistor 40*a* to draw through resistor 44*a* a current which will maintain gate-cathode and gate-anode conduction through thyristor 41*a*. Since switching network 22*a* presents a low impedance to subscriber line current when latched conduction therethrough occurs, the current flowing through the gate-cathode circuit of thyristor 41*a* is dependent largely upon the resistance of the subscriber line. Since, in addition, the gate-anode current in thyristor 41*a* is proportional to the current flowing through the gate-cathode circuit thereof, it will be seen that the magnitude of the gate-anode latching current is dependent upon the subscriber line resistance. Consequently, as the subscriber line resistance rises toward its leakage resistance value, the magnitude of the latching current decreases toward the value at which switching network 22*a* will become unlatched.

In order to control the subscriber line current level at which switching network 22*a* unlatches, resistor 39*a* connects the gate-anode circuit of thyristor 41*a* across booster source 24*a*. This resistor causes booster source 24*a* to divert a substantially fixed amount of the latching current flowing through the gate-anode circuit of thyristor 41*a* away from the base of transistor 40 resulting in the starvation of base-emitter control current. As a result, the latching current will decrease more rapidly, on a percentage basis, than the subscriber line current. Accordingly, for a known value of resistor 44*a*, the unlatching point for switching network 22*a* may be set by selecting a suitable value for latching current diverting resistor 39*a*. Thus, it will be seen that threshold resistor 44a and latching current diverting resistor 39a comprise turn-off circuitry for switching network 22a of FIG. 1. It will be understood that in the present embodiment the value of resistor 39*a* is such that switching network 22*a* will unlatch and thereby terminate the voltage boosting activity of circuit A when the opening of dialing contacts 11c causes the subscriber line current to drop to its leakage current value.

As described previously, capacitor 45*a* is charged to a voltage substantially equal to the voltage across booster source 24*a* when boost switching network 22*a* conducts. In order to prevent this capacitor from maintaining a boost voltage between terminals 18*a* and 19*a* after switching network 22*a* has been unlatched as a result of a dial pulse interruption, it is desirable to provide a path through which capacitor 45*a* may be rapidly discharged.

In the present embodiment, the discharge path for capacitor 45*a* includes conductors 46*a* and 28*a*, the power circuit of bypass switching network 23*a* and conductors 29*a* and 47*a*. Conduction is initiated in this discharge path by current which capacitor 45*a* establishes in the path including conductors 46*a* and 28*a*, the control circuit of switching network 23*a*, conductor 37*a*, resistor 39*a* and conductor 47*a*. Thus, the occurrence of a dial pulse interruption not only unlatches boost switching network 22*a* but also eliminates the effect of latched conduction therethrough by discharging the capacitor associated therewith.

Because the unlatching of switching network 22*a* and the discharge of capacitor 45*a* occur within a time which is short in relation to the duration of dial pulse interruptions, and because the latching of switching network 22*a* occurs at least as rapidly as the unlatching thereof, the boost voltage which appears between terminals 18*a* and 19*a* during dialing has a waveform which has a fast rise and fall time. This waveform helps to reshape the subscriber line current waveform (during dialing) to make the latter more closely approach its ideal rectangular waveform. Thus, the booster circuitry of the invention not only increases the magnitude of the subscriber line current but also improves the waveform thereof.

It will be seen that resistors 44*b* and 39*b* and capacitor 45*b* connected to boost-bypass circuit B operate in the same manner that resistors 44*a* and 39*a* and capacitor 45*a* operate with respect to boost-bypass circuit A. This causes circuit B to exhibit the same latching and unlatching characteristics as circuit A. It will be understood that if it is desirable for one or the other of the above boost-bypass circuits not to exhibit the above described latching and unlatching characteristics, this may be accomplished by removing the current threshold resistor located in the boost switching network of that boost-bypass circuit.

To the end that the circuitry of FIG. 1 may protect both itself and the subscriber line from excessive current in the event that it is connected to a low resistance line, sources 24*a* and 24*b* are arranged so that the boost voltage introduced thereby decreases as the current flowing therethrough increases. In the present embodiment, this voltage-current characteristic is afforded by loosely coupling the primary and secondary windings of transformer 9 and by connecting a capacitor 50 in series with the primary of transformer 9.

It will be understood that the circuit of the invention will perform as described if connected anywhere in the transmission line which connects a central office battery in energizing relationship to a subscriber telephone set. Thus, the circuit of the invention may be located between the central office switching equipment and subscriber terminals 16*a* and 16*b*, as shown in FIG. 1, or may be located in the subscriber line to the right of those terminals in FIG. 1. In addition, the circuit of the invention may be connected in a trunk line between central offices or between the central office battery and the central office switching equipment. If the booster circuitry is located in the latter position, it will not be exposed to supervisory polarity reversals. As a result, the advantages of the invention may be afforded by connecting a boost-bypass circuit such as circuit A in series with one lead of the central office battery.

Figure 2:
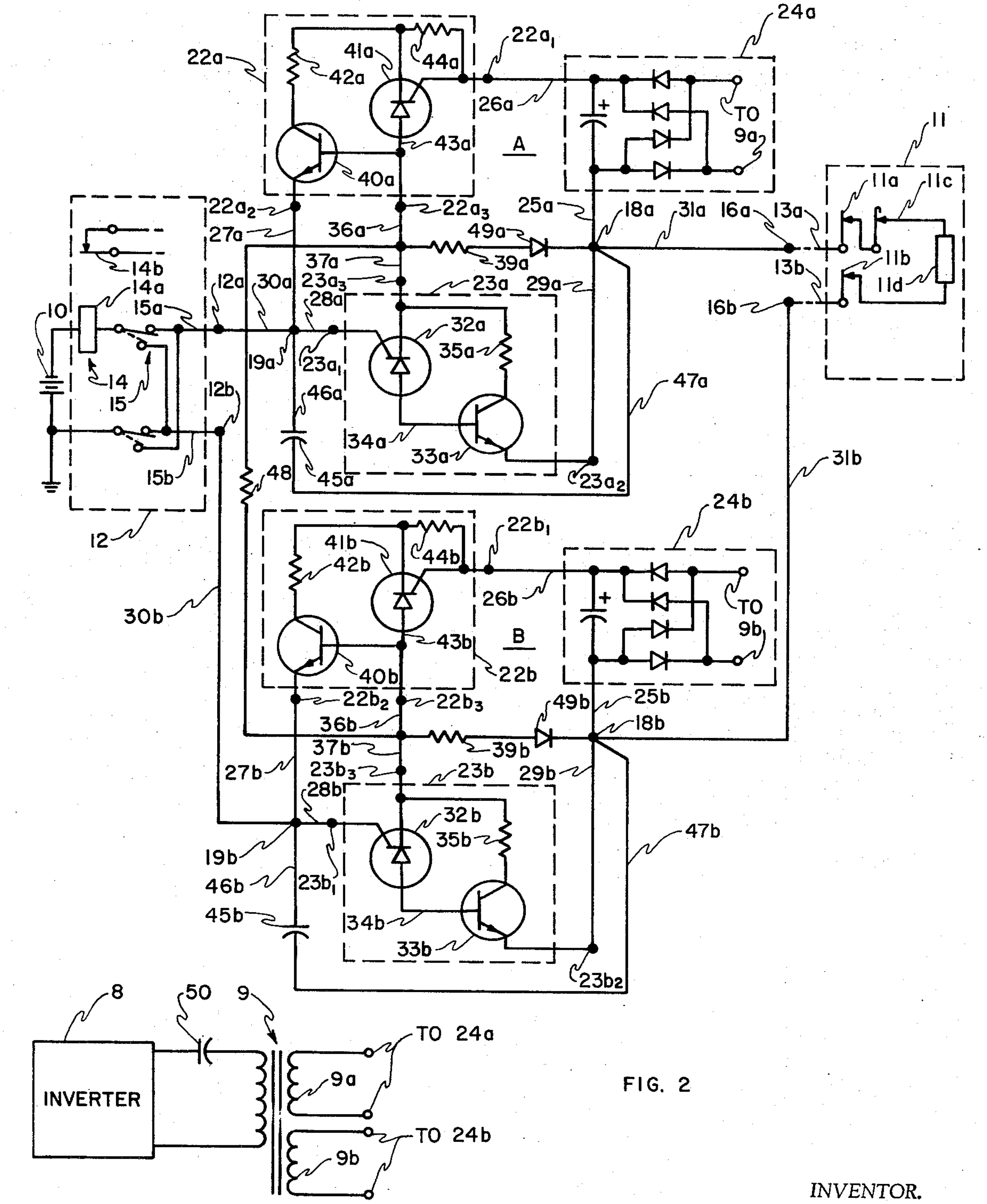
FIGS. 2 and 3 are schematic diagrams of modified circuits embodying the invention.

The circuit of FIG. 2 is similar to that of FIG. 1 and like parts are similarly numbered. This circuit differs from FIG. 1 in that the switching networks of FIG. 2 are controlled by the central office voltage while the switching networks of FIG. 1 are controlled by the subscriber line current. This difference is implemented in FIG. 2 by connecting a trigger current conducting resistor 48 between connected terminals $22a_3$ and $23a_3$ of network A and connected terminals $22b_3$ and $23b_3$ of network B and by connecting diodes 49*a* and 49*b* in series with resistors 39*a* and 39*b*, respectively.

When central office battery 10 renders terminal 12*b* positive from terminal 12*a*, a trigger current flows from terminal 12*b* through conductors 30*b* and 28*b*, the control circuit of network 23*b*, conductor 37*b*, upward through resistor 48, conductor 36*a*, the control circuit of network 22*a* and conductors 27*a* and 30*a* to terminal 12*a*. This current initiates latched conduction through the power circuits of networks 23*b* and 22*a*, in the manner described with reference to FIG. 1, to insert booster source 24*a* in series-aiding relationship to the then existing central office terminal voltage.

Similarly, when central office battery 10 renders terminal 12*a* positive from terminal 12*b*, trigger current flows through the control circuits of networks 23*a* and 22*b*, downwardly through resistor 48. This current initiates latched conduction through the power circuits of networks 23*a* and 22*b*, in the manner described with reference to FIG. 1, to insert booster source 24*b* in series-aiding relationship to the then existing central office terminal voltage.

During the time when above central office terminal polarities exist, diodes 49*a* and 49*b* prevent subscriber line current from energizing the control circuits of switching networks 22*a* and 22*b*. These diodes do not, however, prevent the diversion of gate-anode latching current away from the bases of transistors 40*a* and 40*b*, such currents being necessary to afford the previously described unlatching chracteristics of networks 22*a* and 22*b*. It will be understood that if it is permissible for switching networks 22*a* and 22*b* to be subject to current control as well as voltage control, diodes 49*a* and 49*b* may be short circuited.

Figure 3:
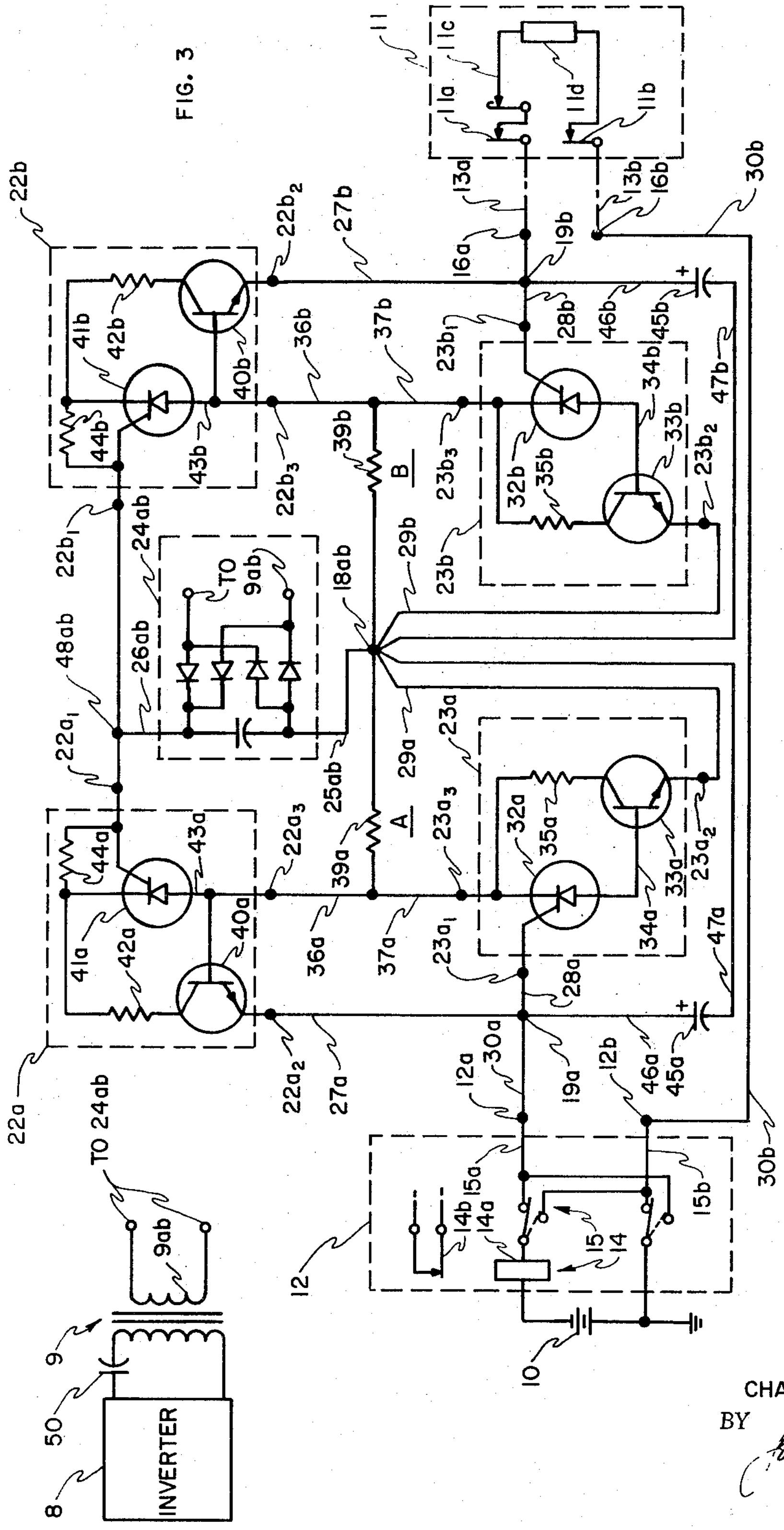

It it is desirable for the d-c boost voltage to appear in the same side of the subscriber line during both central office terminal polarities, this may be accomplished by the circuit of FIG. 3. This circuit is a modification of the circuit of FIG. 1 in which boost-bypass circuit B is connected between boost-bypass circuit A and subscriber station 11 rather than directly between central office 12 and subscriber station 11, as shown in FIG. 1. One important advantage of the circuit of FIG. 3 is that it allows boost-bypass circuits A and B to utilize or share a single booster. This is because the series booster circuit configuration of FIG. 3 brings terminals 18*a* and 18*b* and conductors 26*a* and 26*b* of FIG. 1 to the same respective potentials. As a result, terminals 18*a* and 18*b* may be connected together to establish a common terminal 18*ab* and conductors 26*a* and 26*b* may be connected together to establish a common conductor 26*ab* as shown in FIG 3. This, in turn, allows booster sources 24*a* and 24*b* of FIG. 1 to be replaced by a common booster source 24*ab*.

When central office battery 10 renders central office terminal 12*a* positive from central office terminal 12*b*, trigger current flows from terminal 12*a* to terminal 12*b* through conductors 30*a* and 28*a*, the control circuit of switching network 23*a*, resistors 39*a* and 39*b*, the control circuit of switching network 22*b* and conductors 27*b*, 31*a* and 13*a*, telephone set 11, and conductors 13*b* and 30*b*. This trigger current initiates latched conduction through the power circuits of switching networks 23*a* and 22*b*, in the manner described with reference to FIG. 1, to insert booster source 24*ab* in series-aiding relationship to central office battery 10 through the path including conductors 15*a*, 30*a* and 28*a*, the power circuit of switching network 23*a*, conductors 29*a* and 25*ab*, booster source 24*ab*, conductor 26*ab*, the power circuit of switching network 22*b*, conductors 27*b*, 31*a* and 13*a*, telephone set 11, and conductors 13*b*, 30*b* and 15*b*.

Similarly, when central office battery 10 renders central office terminal 12*b* positive from central office terminal 12*a*, a current flows from terminal 12*b* to terminal 12*a* through conductors 30*b* and 13*b*, telephone set 11, conductors 13*a*, 31*a* and 28*b*, the control circuit of switching network 23*b*, resistors 39*b* and 39*a*, the control circuit of switching network 22*a* and conductors 27*a* and 30*a*. This trigger current initiates latched conduction in the power circuits of switching networks 23*b* and 22*a* to insert booster source 24*ab* in series-aiding relationship to central office battery 10 through the path including conductors 15*a*, 30*b* and 13*b*, telephone set 11, conductors 13*a*, 31*a* and 28*b*, the power circuit of switching network 23b, conductors 29*b* and 25*ab*, booster source 24*ab*, the power circuit of switching network 22*a*, conductors 27*a*, 30*a* and 15*a*. Thus, boost-bypass circuits A and B of FIG. 3 insert booster source 24*ab* with whatever polarity is necessary to boost the central office battery voltage.

It will be understood that the unlatching of first switching networks 22*a* and 22*b* of FIG. 3 occurs in the manner described with reference to FIG. 1 and that capacitors 45*a* and 45*b* are charged and discharged in the manner described with reference to FIG. 1. This assures that the circuit of FIG. 3 may provide the desired boost voltage without adversely affecting the dialing characteristics of the subscriber line.

Because switching networks 23*a* and 22*b* insert booster source 24*ab* in power aiding relationship to a rightward flowing subscriber line current as viewed in FIG. 3 and because switching networks 23*b* and 22*a* insert booster source 24*ab* in power aiding relationship to a leftward flowing subscriber line current as viewed in FIG. 3, it will be seen that the circuit is similar to a bridge circuit having a latchable switching network in each arm. If the circuit of FIG. 3 is so considered, the a-c terminals of the bridge are terminals 19*a* and 19*b* and the d-c terminals of the bridge are terminals 18*ab* and 48*ab*.

Figure 4:
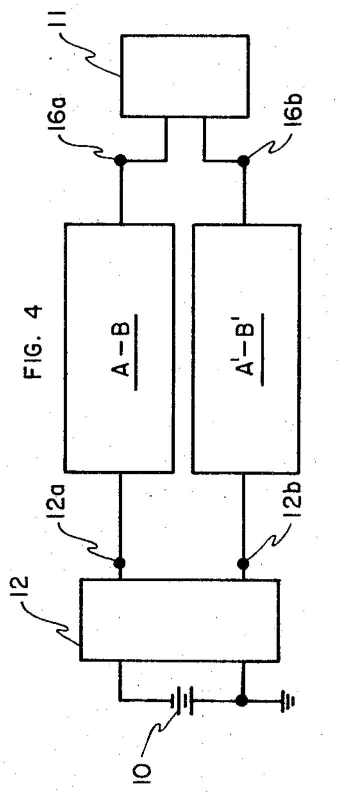
FIG. 4 is a block diagram showing another circuit embodying the invention.

If it is desirable for substantially equal boost voltages to appear in both sides of the subscriber line for both polarities of the central office terminal voltage, this may be accomplished by the circuit arrangement of FIG. 4. This circuit of FIG. 4 includes first and second booster arrangements A-B and A'-B', respectively, each of which comprises a booster circuit of the type shown in FIG. 3. It will be understood that booster arrangements A-B and A'-B', of FIG. 4 each operate in the manner described with reference to the circuitry of FIG. 3 to insert the respective booster source in series, power-aiding relationship to the current flowing therethrough.

Under circumstances where the circuit of FIG. 4 serves a subscriber line having a high value of distributed capacitance, the energy that is stored in the line during voltage boosting may cause reactive currents to flow during dial pulse interruptions. If these reactive currents are of sufficient magnitude, they may interefere with the desired pattern of conduction in the switching networks within booster arrangements A-B and A'-B'. I have found that the undesirable effect of these reactive currents is reduced by making the latching threshold of the booster arrangement in one side of the subscriber line different from the latching threshold of the booster arrangement in the other side of the subscriber line.

Assuming, for example, that central office terminal 12*b* is positive from central office terminal 12*a* during dialing, I have found that the effect of reactive currents on the dialing characteristics of the subscriber may be reduced by making the latching threshold of that switching network within A-B which corresponds to switching network 22*a* in FIG. 3, unequal to the latching threshold of that switching network within A'-B' which corresponds to switching network 22*b* in FIG. 3. This is accomplished by making those current threshold and latching current conducting resistors in A-B which are the counterparts in A-B of resistors 44*a* and 39*a* respectively in FIG. 3 different in resistance value from those current threshold and latching current conducting resistors in A'-B' which latter are the counterparts in A'-B' of resistors 44*b* and 39*b* respectively in FIG. 3.

Figure 5:
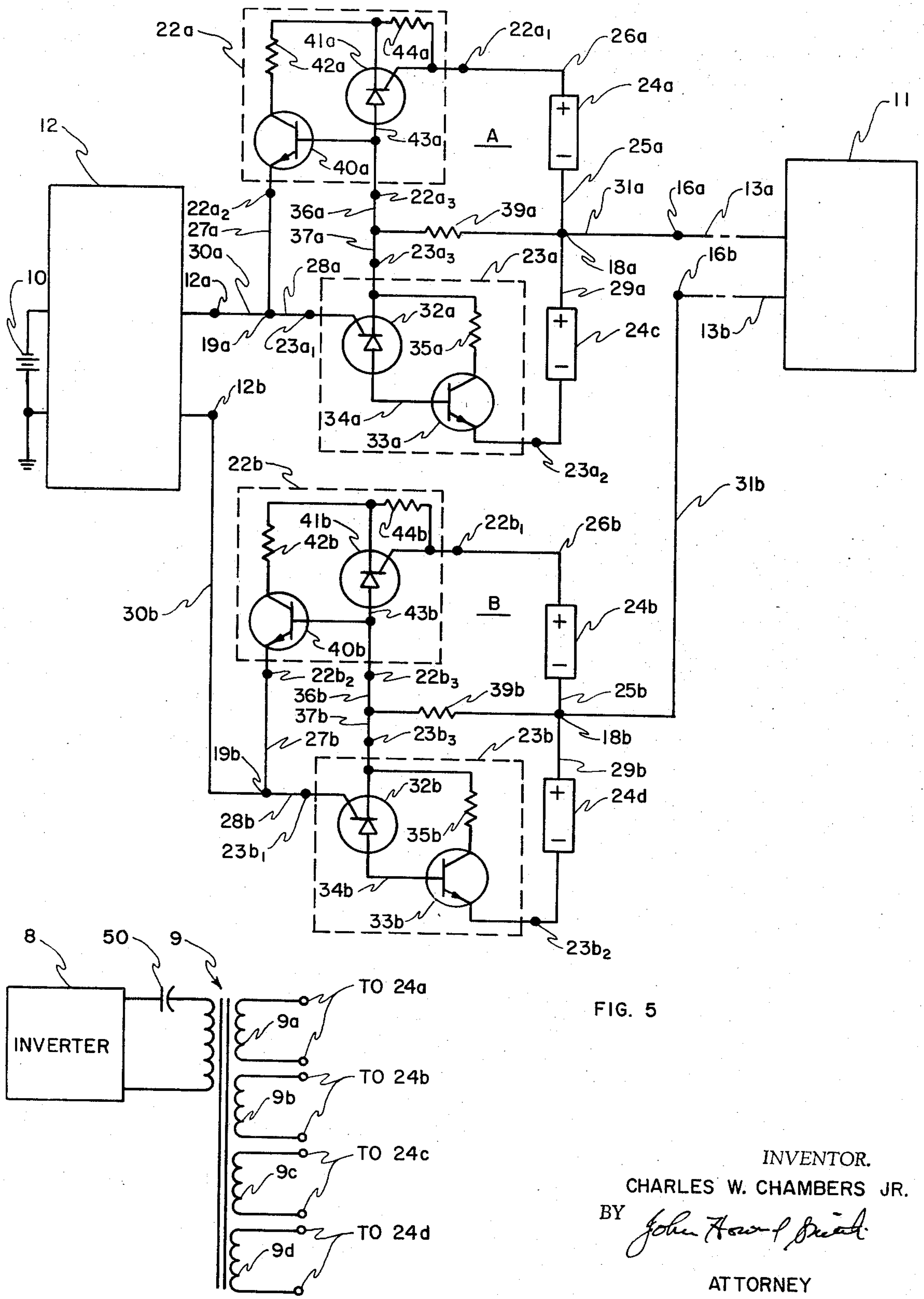
FIG. 5 is a schematic diagram of still another circuit embodying the invention.

Another booster arrangement suitable for introducing substantially equal boost voltages into both sides of the subscriber line for both polarities of the central office terminal voltage is shown in FIG. 5. The circuit of FIG. 5 is similar to that of FIG. 1 and like parts are similarly numbered. This circuit differs from that of FIG. 1 in that additional booster sources 24*c* and 24*d* of FIG. 5 are connected in series with switching networks 23*a* and 23*b*, respectively. These additional booster sources may be energized from additional secondary windings 9*c* and 9*d* on transformer 9.

When central office terminal 12*b* is positive from central office terminal 12*a*, switching networks 23*b* and 22*a* are rendered conducting, in the manner described with reference to FIG. 1, to insert booster sources 24*d* and 24*a* in series, power-aiding relationship to the currents in conductors 13*b* and 13*a*, respectively. Similarly, when central office terminal 12*a* is positive from central office terminal 12*b*, switching networks 23*a* and 22*b* are rendered conducting to insert booster sources 24*c* and 24*b* in power-aiding relationship to the currents in conductors 13*a* and 13*b*, respectively. It will be understood that switching networks 22*a* and 22*b* operate in the manner described with reference to FIG. 1 to prevent the booster sources of FIG. 5 from boosting the leakage current of the subscriber line during dial pulse interruptions.

From the foregoing, it will be seen that voltage boosting circuitry constructed in accordance with the invention is adapted to increase the d-c operating voltage of a respective long subscriber line in telephone systems utilizing reverse battery supervision, and interrupts the voltage boosting relationship between a booster source and the central office battery in accordance with the magnitude of the subscriber line current, these interruptions being sufficiently rapid to prevent the circuit of the invention from increasing the leakage current of the subscriber line during dial pulse interruptions.

It will be understood that the above embodiments are for descriptive purposes only and may be changed or modified without departing from the spirit and scope of the appended claims.

What is claimed is:

1. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, booster source means, latchable switching means for connecting said booster source means between the central office battery and the transmission line in series-aiding relationship to the central office battery, means for connecting said latchable switching means to the transmission line and to said booster source means, means for initiating conduction through said switching means when the central office battery is connected to the transmission line with a predetermined polarity, threshold means for establishing a current threshold for latched conduction through said latchable switching means, means for connecting said threshold means to said latchable switching means, means for diverting latching current away from said latchable switching means in accordance with the magnitude of current in the transmission line and means for connecting said diverting means to said latchable switching means.

2. In a circuit for increasing and decreasing the d-c operating voltage of a cummunications transmission line in a telephone system or the like in accordance with the magnitude of current flow through the transmission line, said transmission line being connected to a central office battery of the telephone system, to receive a substantially fixed d-c operating voltage, in combination, booster source means, first switching means for connecting said booster source means between the central office battery and the transmission line in series-aiding relationship to the central office battery, second switching means for bypassing transmission line current around said first switching means, means for connecting said switching means to the transmission line, means for initiating condution through said first or second switching means when the central office battery is connected to the transmission line with respective first or second polarities, means for turning off said first switching means when the transmission line current flowing therethrough drops below a predetermined value and means for connecting said turn off means to said first switching means and to said booster source means.

3. A voltage booster circuit as set forth in claim 2 including capacitance means, means for connecting said capacitance means to said first switching means and to said booster source means to filter the boost voltage added by the voltage boosting circuitry during the conduction of said first switching means and means for connecting said capacitance means to said second switching means.

4. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, first latchable switching means for controlling the flow of current in a first direction in the transmission line, said first latchable switching means including power circuit means and control circuit means, second switching means for controlling the flow of current in a second direction in the transmission line, said second switching means including power circuit means and control circuit means, means for connecting the power circuit means of said switching means in series with the transmission line, means for energizing the control circuit means of said first or second switching means when the central office battery is connected to the transmission line with respective first or second polarities, booster source means, means for connecting said booster source means in series with the power circuit means of said first latchable switching means, current threshold means for establishing a current threshold for latched conduction through said first latchable switching means, means for connecting said current threshold means to said first latchable switching means, means for diverting latching current away from said first latchable switching means and means for connecting said latching current diverting means to said first latchable switching means.

5. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, a plurality of booster circuits each having first and second terminal means, each booster circuit including first latchable switching means for controlling the flow of current from the first to the second terminal means thereof and second switching means for controlling the flow of current from the second to the first terminal means thereof, means for connecting said booster circuits in series with the transmission line, means for initiating conduction through said first or second switching means when the central office battery is connected to the transmission line with respective first or second polarities, booster source means, means for connecting said booster source means between the terminal means of respective booster circuits through respective first latchable switching means, threshold means for establishing current thresholds for latched conduction through said first latchable switching means, means for connecting said threshold means to said first latchable switching means, means for diverting latching current away from said first latchable switching means in accordance with the magnitude of current in the transmission line and means for connecting said latching current diverting means to said first latchable switching means and to said booster source means.

6. A voltage boosting circuit as set forth in claim 5 including capacitance means, means for connecting said capacitance means between the terminal means of respective booster circuits, and means for connecting said capacitance means to respective second switching means.

7. In a circuit for increasing and decreasing the d-c operating voltage of a communications transmission line in a telephone system or the like in accordance with the magntidue of current flow through the transmission line, said transmission line being connected to a central office battery of the telephone system, to receive a substantially fixed d-c operating voltage, in combination, first and second terminal means for disposition in series with one conductor of a transmission line, a first latchable switching network for controlling the flow of transmission line current from said first to said second terminal means, said first latchable switching network including triggering means having a power circuit and a control circuit and latching means having a power circuit and a control circuit, a second switching network for controlling the flow of transmission line current from said second to said first terminal means, means for connecting the power circuit of said triggering means between the said first and second terminal means through the control circuit of said latching means, means for connecting the control circuit of said triggering means between said first and second terminal means through the power circuit of said latching means, a booster source, means for connecting said booster source between said terminal means through said first latchable switching network, means for initiating conducting through said first or second switching networks when the central office battery is connected to the transmission line with respective first or second polarities, current threshold means for establishing a current threshold for conduction through the control circuit of said latching means, means for connecting said current threshold means across the control circuit of said latching means, means for diverting current away from the control circuit of said triggering means in accordance with the magnitude of current in the transmission line and means for connecting said booster source, said current diverting means and the power circuit of said latching means in a closed circuit path.

8. A voltage boosting circuit as set forth in claim 7 including capacitance means, means for connecting said capacitance means between said first and second terminal means and means for connecting said capacitance means to said second switching network.

9. A voltage booster circuit as set forth in claim 7 in which said means for connecting said central office battery to said switching networks to control the conduction thereof comprises trigger current conducting means and means for connecting said trigger current conducting means between said first and second terminal means.

10. A voltage boosting circuit as set forth in claim 7 in which said means for connecting said central office battery to said switching networks to control the conduction thereof comprises trigger current conducting means and means for connecting said trigger current conducting means between the transmission line conductors.

11. A voltage boosting circuit as set forth in claim 7 in which said latching means is a thyristor and in which said triggering means is an NPN transistor.

12. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, a plurality of booster circuits each having first and second terminal means, each booster circuit including a first latchable switching network for initiating and terminating the flow of current from the first to the second terminal means thereof and a second switching network for initiating the flow of current from the second to the first terminal means thereof, means for connecting the second terminal means of each booster circuit to a respective central office terminal, means for connecting the first terminal means of each booster circuit to a respective subscriber line terminal, means for initiating conduction through said first and second switching networks when the central office battery is connected to the transmission line with respective first or second polarities, booster source means, means for connecting said booster source means between said first and second terminal means through respective first latchable switching networks, current threshold means for establishing a current threshold for latched conduction through said first latchable switching means, means for connecting said current threshold means to said first latchable switching networks, means for diverting latching current away from said first latchable switching networks in accordance with the magnitude of current in the subscriber line and means for connecting said latching current diverting means between said first latchable switching networks and said booster source means.

13. A voltage boosting circuit as set forth in claim 12 including capacitance means, means for connecting said capacitance means between the first and second terminal means of respective booster circuits and means for connecting said capacitance means to respective second switching networks.

14. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, a plurality of booster circuits each having first and second terminal means, each booster circuit including a first latchable switching network for initiating and terminating flow of current from the first to the second terminal means thereof and a second switching network for initiating the flow of current from the second to the first terminal means thereof, means for connecting the second terminal means of one booster circuit to one central office terminal, means for connecting the second terminal means of another booster circuit to one subscriber line terminal, means for connecting the first terminal means of said one booster circuit to the first terminal mpans of said another booster circuit, booster source means, means for connecting said booster source means between said connected first terminal means and said first latchable switching networks, current threshold means for establishing a current threshold for latched conduction through said first latchable switching networks, means for connecting said threshold means to said first latchable switching networks, means for diverting latching current away from said first latchable switching networks and means for connecting said latching current diverting means to said first latchable switching networks and to said booster source means.

15. A voltage boosting circuit as set forth in claim 14 including capacitance means, means for connecting said capacitance means between the first and second terminal means of respective booster circuits and means for connecting said capacitance means to respective second switching networks.

16. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, first and second terminal means for dispostion in series with a transmission line, first latchable switching means for initiating and terminating the flow of current in a first direction in the transmission line, said first latchable switching means including power circuit means and control circuit means, second switching means for initiating the flow of current in a second direction in the transmission line, said second switching means including power circuit means and control circuit means, means for connecting the power circuit means of said switching means between said first and second terminal means, means for energizing the control circuit means of or first and second switching means when the central office battery is connected to the transmission line with respective first or second polarities, booster source means, means for connecting said booster source means between said terminal means through the power circuit means of said first latchable switching means, current threshold means for establishing a current threshold for latching conduction through said first latchable switching means, means for connecting said current threshold means to said first latchable switching means, means for diverting latching current away from the power circuit means of said first latchable switching means and means for connecting said latching current diverting means to said first latchable switching means and to said booster source means.

17. A voltage boosting circuit as set forth in claim 16 including capacitance means, means for connecting said capacitance means to said booster source means through the power circuit means of said first latchable switching means, means for connecting said capacitance means to the control circuit means of said second switching means and means for connecting said capacitance means across the power circuit means of said second switching means.

18. A voltage boosting circuit as set forth in claim 16 in which said means for connecting the central office battery to the control circuit means of said switching means includes trigger current conducting means and means for connecting said trigger current conducting means between said first and second terminal means through the control circuit means of said switching means.

19. A voltage boosting circuit as set forth in claim 16 in which said means for connecting the central office battery to the control circuit means of said switching means includes trigger current conducting means and means for connecting said trigger current conducting means across the transmission line through the control circuit means of said switching means.

20. A voltage boosting circuit as set forth in claim 16 in which each of said booster source means comprises an a-c to d-c converter having an output voltage which decreases as the current flowing therethrough increases.

21. In a circuit for increasing and decreasing the d-c operating voltage of a communicaTions transmission line in a telephone system or the like in accordance with the magnitude of current flow through the transmission line, said transmission line being connected to a central office battery of the telephone system, to receive a substantially fixed d-c operating voltage, in combination, first and second terminal means for disposition between a central office battery and a transmission line, first switching means for controlling the flow of current from said first to said second terminal means, second switching means for controlling the flow of current from said second to said first terminal means, booster source means, means for connecting said booster source means between said terminal means through said first switching means, means for initiating conduction through said first or second switching means when the central office battery is connected to the transmission line with respective first or second polarities, said first switching means including: triggering means having a power circuit and a control circuit, latching means having a power circuit and a control circuit, said latching means comprising means for controlling the flow of latching the magnitude of current through the control circuit of said triggering means in accordance with the magnitude of the transmission line current entering said first terminal means, said triggering means comprising means for controlling the flow of current through the control circuit of said latching means in accordance with the magnitude of the latching current flowing through the control circuit of said triggering means, threshold means for setting a current threshold for conduction through said latching means, means for connecting said threshold means to said latching means, means for diverting latching current away from the control circuit of said triggering means in accordance with current in the transmission line, means for connecting said diverting means to the control circuit of said triggering means and means for connecting said latching means and said triggering means to each other.

22. A voltage boosting circuit as set forth in claim 21 including capacitance means, means for connecting said booster source means to said capacitance means through said first switching means, means for connecting said capacitance means across said second switching means and means for connecting said capacitance means to said second swithcing means to initiate conduction through said second switching means on switching off of said first switching means.

23. In a circuit for increasing and descreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, bridge circuit means having a-c terminal means and d-c terminal means, means for connecting said a-c terminal means in series with a transmission line, booster source means, means for connecting said booster source means across said d-c terminal means, said bridge circuit means including a switching network in each arm, means for connecting the central office battery to said switching networks to initiate conduction through the switching networks in one pair of arms of said bridge circuit means for one polarity of the central office battery and to initiate conduction through the switching networks in a different pair of arms of said bridge means for the other polarity of the central office battery, current threshold means for setting a current threshold for conduction through at least one of said switching networks, means for connecting said current threshold means to at least one of said switching networks, current diverting means for controling the magnitude of current flow through the current threshold means of those switching networks having current threshold means in accordance with the magnitude of current in the transmission line and means for connecting said current controlling means to said booster source means and to said at least one of said switching networks.

24. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, a plurality of bridge circuit means each having a-c terminal means and d-c terminal means, means for connecting the a-c terminal means of one of said bridge circuit means in series with one side of a transmission line, means for connecting the a-c terminal means of another of said bridge circuit means in series with the other side of a transmission line, booster source means, means for connecting said booster source means across the d-c terminal means of respective bridge circuit means, each of said bridge circuit means including a switching network in each arm means for connecting the central office battery to said bridge circuit means to inititate conduction through the switching networks in one pair of arms for one polarity of the central office battery and to initiate conduction through the switching networks in a different pair of arms for the other polarity of the central office battery, current threshold means for setting a current threshold for conduction through at least one of the switching networks in each of said bridge circuit means, means for connecting said current threshold means to at least one of the switching networks in each of said bridge circuit means, current diverting means for controlling the magnitude of current flow through the current threshold means of those switching networks having current threshold means in accordance with the magnitude of current in the transmission line and means for connecting said current diverting means to said booster source means and to those switching networks having current threshold means.

25. A voltage boosting circuit as set forth in claim 24 in which the current threshold for conduction through one of said bridge circuit means is different from the current threshold for conduction through the other of said bridge circuit means.

26. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, a plurality of booster sources, first switching means for connecting one of said booster sources in series-aiding relationship to the central office battery when current in the transmission line flows in one direction, second switching means for connecting another of said booster sources in series-aiding relationship to the central office battery when current in the transmission line flows in the other direction, means for connecting said switching means in series with the transmission line, means for connecting said switching means to said booster sources, means for initiating conduction through said first or second switching means when the central office battery is connected to the transmission line with respective first or second polarities, means for turning off one of said switching means in accordance with the magnitude of current in the transmission line and means for connecting said turn-off means to said one switching means.

27. In a circuit for increasing and decreasing the d-c operating voltage of a communications transmission line in a telephone system or the like in accordance with the magnitude of current flow through the transmission line, said transmission line being connected to a central office battery of the telephone system, to receive a substantially fixed d-c operating voltage, in combination, booster source means, latchable switching means for connecting said booster source means in series-aiding relationship to the central office battery, means for connecting said latchable switching means in series with the transmission line, means for connecting said latchable switching means in series with said booster source means, means for initiating conduction through said switching means when the central office battery is connected to the transmission line with a predetermined polarity, current responsive means for initiating latched conduction through said latchable switching means when the current in the transmission line rises above a preselected value greater than the leakage current value of the transmission line and for terminating such latched conduction when the current in the transmission line drops below said preselected value, and means for connecting said current responsive means to said latchable switching means.

28. In a circuit for increasing and decreasing the d-c operating voltage of a communcations transmission line in a telephone system or the like in accordance with the magnitude of current flow through the transmission line, said transmission line being connected to a central office battery of the telephone system to receive a substantially fixed d-c operating voltage, in combination, booster source means, latchable switching means for connecting said booster source means in series-aiding relationship to the central office battery, means for connecting said latchable switching means in series with the transmission line and in series with said booster source means, first means for establishing latched conduction through said switching means when the central office battery is connected to the transmission line with a predetermined polarity and the transmission line current exceeds a preselected value greater than the leakage current of the transmission line, second means for terminating latched conduction through said switching means when the current in the transmission line drops below said preselected value, and means for connecting said first and second means to said switching means and to the transmission line.

* * * * *

UNITED STATES PATENT OFFICE
CERTIFICATE OF CORRECTION

Patent No. 3,763,319 Dated October 2, 1973

Inventor(s) Charles W. Chambers, Jr.

It is certified that error appears in the above-identified patent and that said Letters Patent are hereby corrected as shown below:

In the specification, Column 1, line 60, change "liner" to --line--. Column 4, line 11, change "conductors" to --conducts--. Column 6, line 48, change "conections" to --connections--. Column 11, line 44, change "chracteristics" to --characteristics--. Column 11, line 49, change "It" to --If--. Column 12, line 31, change "15a" to --15b--. Column 13, lines 9 and 10, change "interefere" to --interfere--.

In the claims, Claim 7, line 4, change "magntidue" to --magnitude--. Claim 7, line 27, change "conducting" to --conduction--. Claim 9, line 1, change "booster" to --boosting--. Claim 14, line 20, change "mpans" to --means--. Claim 16, line 20, change "or" to --said--. Claim 16, line 27, change "latching" to --latched--. Claim 21, line 2, change "communicaTions" to --communications--. Claim 22, line 7, change "swithcing" to --switching--.

Claim 23, line 1, change "descreasing" to --decreasing--. Claim 23, line 20, after "bridge" insert --circuit--. Claim 23, line 25, change "controling" to --controlling--.

Signed and sealed this 4th day of June 1974.

(SEAL)
Attest:

EDWARD M.FLETCHER,JR.
Attesting Officer

C. MARSHALL DANN
Commissioner of Patents